(12) United States Patent
Cox et al.

(10) Patent No.: US 8,643,498 B1
(45) Date of Patent: Feb. 4, 2014

(54) OPTICAL SWITCHES FOR TANK ENVIRONMENTS

(76) Inventors: Christopher E. Cox, Baton Rouge, LA (US); Raleigh L. Cox, Baton Rouge, LA (US)

( * ) Notice: Subject to any disclaimer, the term of this patent is extended or adjusted under 35 U.S.C. 154(b) by 163 days.

(21) Appl. No.: 13/180,744

(22) Filed: Jul. 12, 2011

Related U.S. Application Data (60) Provisional application No. 61/363,952, filed on Jul. 13, 2010.

(51) Int. Cl.
*G08B 21/00* (2006.01)

(52) U.S. Cl.
USPC ............... 340/619; 340/636.11; 340/693.11

(58) Field of Classification Search
USPC ......... 340/619, 618, 623–625, 615, 612, 604, 340/593, 627, 636.11, 691.1, 682.6, 693.5, 340/693.11
See application file for complete search history.

(56) References Cited

U.S. PATENT DOCUMENTS

| | | | |
|---|---|---|---|
| 3,082,400 A | 3/1963 | Coop | |
| 3,120,125 A | 2/1964 | Vasal | |
| 3,863,067 A | 1/1975 | Gooley | |
| 4,051,723 A | 10/1977 | Head et al. | |
| 4,064,754 A | 12/1977 | Frey | |
| 4,091,671 A | 5/1978 | McLees | |
| 4,156,149 A | 5/1979 | Vaccari | |
| 4,519,257 A | 5/1985 | Simpkins | |
| 4,629,841 A | 12/1986 | Riback et al. | |
| 4,773,265 A | 9/1988 | Baillie | |
| 4,801,926 A | 1/1989 | Bitetti | |
| 4,836,632 A | 6/1989 | Bardoorian | |
| 4,856,874 A | 8/1989 | Tusting | |
| 4,938,590 A | 7/1990 | Ishida | |
| 5,017,748 A | 5/1991 | Sapiro | |
| 5,072,617 A | 12/1991 | Weiss | |
| 5,105,663 A | 4/1992 | Kuhlen | |
| 5,124,686 A | 6/1992 | White et al. | |

(Continued)

FOREIGN PATENT DOCUMENTS

| | | |
|---|---|---|
| EP | 0354169 A1 | 2/1990 |
| JP | 56135805 A | 10/1981 |

(Continued)

OTHER PUBLICATIONS

Corning, Corning ClearCurve Optical Fiber, 4-Page Brochure printed from www.corning.com/clearcurve website, copyright 2008, Corning Incorporated.

(Continued)

*Primary Examiner* — Daniel Previl
(74) *Attorney, Agent, or Firm* — Jones Walker LLP (57) ABSTRACT

One embodiment of the invention is a combination of a tank and an optical switch, where the tank has a wall forming an enclosure for holding fluids, and the optical switch has a housing floatable in a liquid stored in the tank, and further has a first light fiber having proximal and distal ends, where the first light fiber is connected to a light source at the distal end, and a second light fiber having proximal and distal ends, the second light fiber connected to a light detector at the distal end, the first and second fibers separated by a gap, and a rigid rod connected to the housing and to the tank enclosure, where the rod moves in response to movement of the housing.

7 Claims, 7 Drawing Sheets

(56) References Cited

U.S. PATENT DOCUMENTS

| | | | |
|---|---|---|---|
| 5,130,535 A | 7/1992 | Kummer et al. | |
| 5,133,030 A | 7/1992 | Lee | |
| 5,175,780 A | 12/1992 | Sano et al. | |
| 5,373,153 A | 12/1994 | Cumberledge et al. | |
| 5,424,831 A * | 6/1995 | Kossat et al. | 356/73.1 |
| 5,585,786 A | 12/1996 | Clark et al. | |
| 5,684,296 A | 11/1997 | Hamblin et al. | |
| 5,743,135 A | 4/1998 | Sayka et al. | |
| 5,874,899 A | 2/1999 | Barmore et al. | |
| 5,917,180 A | 6/1999 | Reimer et al. | |
| 5,950,487 A | 9/1999 | Maresca et al. | |
| 5,991,316 A * | 11/1999 | Kikuchi | 372/21 |
| 6,122,087 A * | 9/2000 | Nogiwa et al. | 398/196 |
| 6,125,218 A | 9/2000 | Humphrey | |
| 6,218,949 B1 * | 4/2001 | Issachar | 340/624 |
| 6,256,430 B1 | 7/2001 | Jin et al. | |
| 6,555,837 B2 | 4/2003 | Benton | |
| 6,650,820 B2 | 11/2003 | Ross et al. | |
| 6,727,822 B2 * | 4/2004 | Chamberlin et al. | 340/620 |
| 6,832,035 B1 | 12/2004 | Daoud et al. | |
| 7,234,830 B1 * | 6/2007 | Cox et al. | 362/101 |
| 7,272,289 B2 | 9/2007 | Bickham et al. | |
| 7,444,042 B1 | 10/2008 | Niblock et al. | |
| 7,714,732 B2 * | 5/2010 | Cox et al. | 340/619 |
| 7,772,538 B2 * | 8/2010 | Cox et al. | 250/221 |
| 7,894,702 B2 | 2/2011 | Ogasawara | |
| 7,902,989 B2 | 3/2011 | Cox et al. | |
| 8,314,711 B2 | 11/2012 | Cox et al. | |
| 8,334,501 B1 | 12/2012 | Cox et al. | |
| 2006/0139177 A1 | 6/2006 | Gomery | |
| 2010/0065488 A1 * | 3/2010 | Milne | 210/242.1 |
| 2010/0066548 A1 | 3/2010 | Cox et al. | |
| 2013/0077915 A1 | 3/2013 | Cox et al. | |
| 2013/0121637 A1 | 5/2013 | Cox et al. | |

FOREIGN PATENT DOCUMENTS

| | | |
|---|---|---|
| JP | 357042817 A | 3/1982 |
| JP | 07218847 A2 | 8/1995 |
| WO | 03/102515 A1 | 12/2003 |

OTHER PUBLICATIONS

PCT Search Report in PCT/US2010/024110 dated Apr. 15, 2010.
PCT Search Report in PCT/US2007/70122 dated Mar. 27, 2008.
PCT Search Report in PCT/US2009/051714 dated Sep. 17, 2009.
Accuflect, Light Reflecting Ceramic, 4 page brochure printed from accaratus.com/accuflprods website, Copyright 2010, Accuratus.
Reflectance Characteristics of Accuflect Light Reflecting Ceramic, pp. 1011, Jul. 2020, Accaratus Ceramic Corporation.
PCT/US12/069866, US International Searching Authority, Search Report dated Feb. 19, 2013, 8 pages.

* cited by examiner

OPTICAL SWITCHES FOR TANK ENVIRONMENTS

PRIORITY CLAIM

This application claims the priority benefit of U.S. application No. 61/363,952, filed on Jul. 13, 2010, which application is hereby incorporated by reference in its entirety.

BACKGROUND OF THE INVENTION

Optical switches have been used in a variety of environments to detect fluid levels. The switch components are generally located in a housing, where the housing is fixed with respect to the fluid level. A fixed housing avoids bending of optical fibers, as bending can cause attenuation and fracture of the optic fibers. One optical switch embodiment with a flexible cable is shown in U.S. patent application Ser. No. 12/577,572, and U.S. application Ser. No. 12/576,894, (both hereby incorporated by reference) and in PCT/US2007/70122, filed on May 31, 2007, hereby incorporated by reference.

Figure 5:
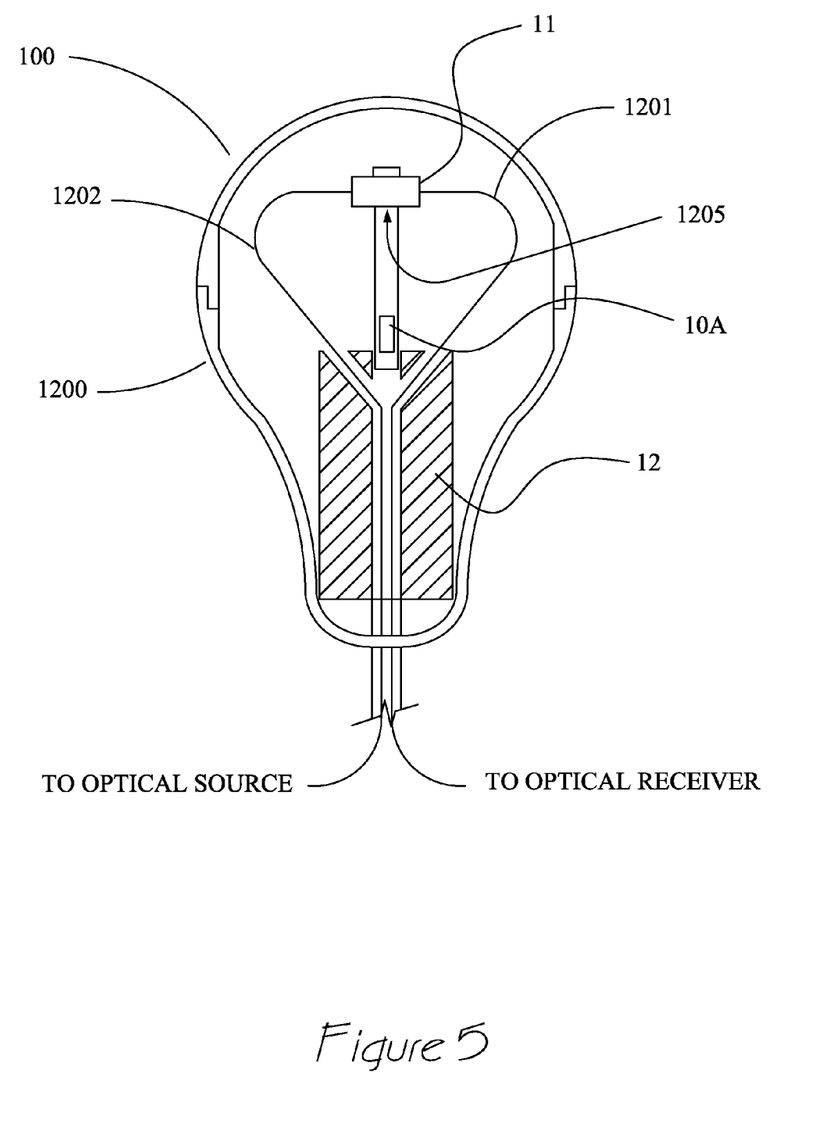
FIG. 5 is a cross section through one embodiment of an optical switch.

Several embodiments of these switches use an optical switch cable that is tethered to the tank, where the switch floats in the fluid. A moveable member is positioned in the switch body, where the moveable member moves to a position within the switch to modify the transmission path of light between an emitting fiber, and a receiving fiber. The light path between fibers can be direct, where the fibers are directly optically aligned or aligned by a bounced specular reflection path where polished or mirrored surfaces are used to modify the path of the emitted beam as desired, or indirect, in the sense that a glowable material is used and illuminated by the emitting light fiber, where the glowable member remits the light or reflects the light into a multitude of directions (e.g. scatters the light, such as by diffuse reflection), and hence the material appears to "glow" or be illuminated from an area much larger than the spot where the optical fiber's emitted light beam is incident on the material. One configuration of an optical switch is shown in FIG. 5, and shows a housing containing two optical fibers, one connected to a light source, the other connected to a light detector, usually remotely located from the housing. The two fibers are separated by a gap, and a moveable member, such as a slug or ball, moves in the gap, such as in an ampoule. As the housing tilts due to rising or falling fluid levels, the moveable member can interrupt or modify the transmission of light across the gap from the emitting fiber to the receiving fiber. The change in the receiving light is then detected at the light receiver. Other versions of optical switches are referenced in the above mentioned applications.

There is a need for optical switches to detect fluid level in a wider class of applications, in particular, tank environments, including a floating roof environment.

DETAILED DESCRIPTION OF THE PREFERRED EMBODIMENT

Figure 1A:
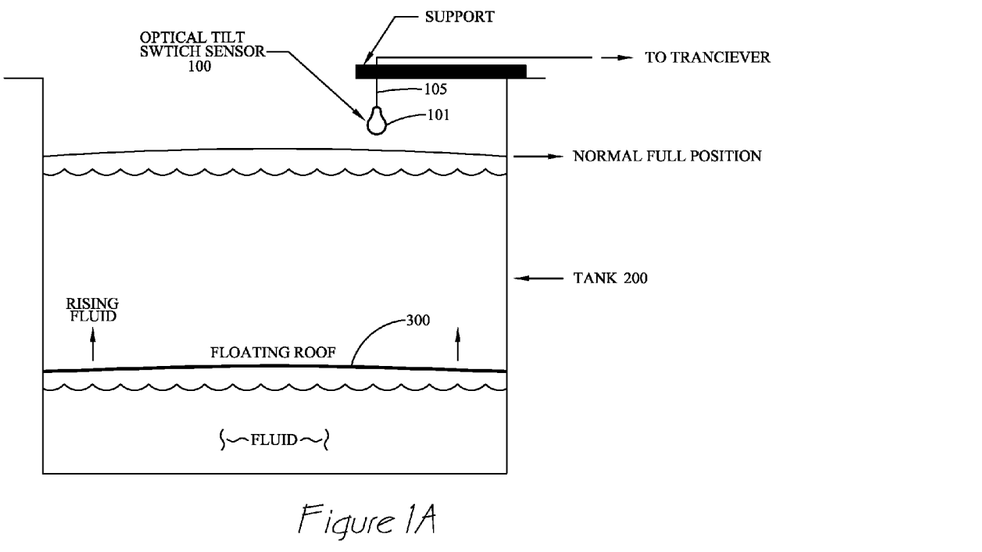
FIG. 1A depicts a tank with a floating roof, with an optical switch hung above the roof.
Figure 1B:
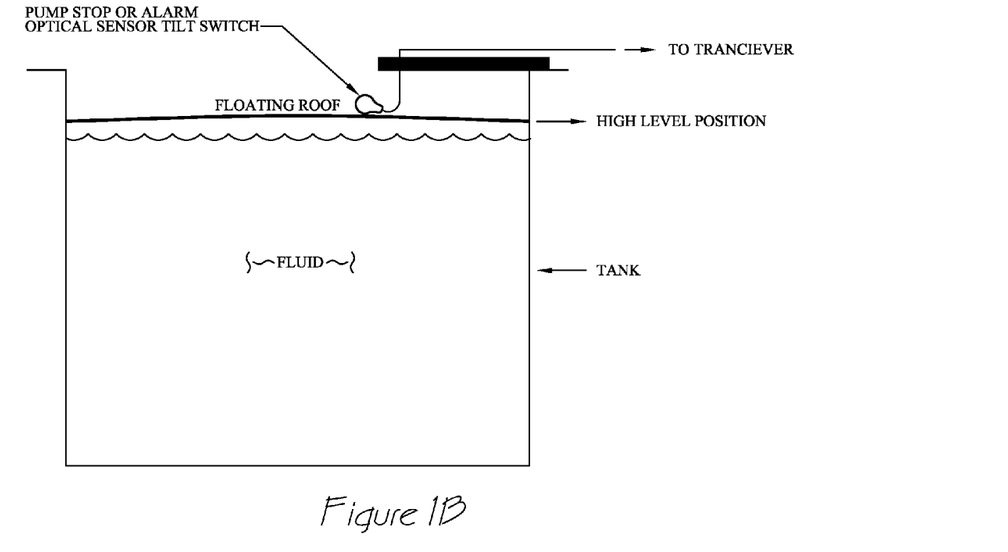
FIG. 1B depicts a tank with a floating roof, with an optical switch hung above the roof after contacting the roof.

Another application of an optical switch is shown in FIGS. 1A and 1B. As shown, the optical switch 100 is usually contained within a housing, and within the housing are two optically alignable fibers where a moveable member is used to change the light characteristics passing between the fibers, such as changing frequency, polarization, or to simply to block transmission or unblock light transmission on the light path between the two optically aligned fibers, as shown in U.S. patent application Ser. No. 12/577,572, or as disclosed in U.S. application Ser. No. 12/576,894. The optical switch components (optical fibers, movable member, including fibers orientated side-by-side and using a glowable switch component or in another embodiment, a polished mirror like reflection surface) shown in these applications are suitable for use in the present applications.

The optical switch 100 is connected to a remotely positioned light source and light receiver, as disclosed in the above two applications. Preferred materials are as disclosed in the above two applications, and the switch can include a means to delay movement of the movable member (to prevent switch flutter). In the cross sectional view of FIG. 5, one embodiment of a portion of the optical switch includes a housing 1200, two light fibers 1201 and 1202, that are optically aligned at the distal ends (or optically alignable), but separated by a gap 1205 (here created by an ampoule, not required), where a moveable member is movable within the gap with movement of the housing, and at at least one position, is interposed between the fibers 1202, 1201 to change the light transmission characteristics between the two fibers.

One embodiment of the present invention is for use in a floating roof tank environment. The tank may be used to store volatile chemicals, making the use of an optical switch desirable. As shown in FIG. 1A, an optical switch 100 is positioned in a housing (here shown as a rounded housing 101), with the housing is positioned above the floating roof 300, hung at a certain height above the roof by a flexible optical cable 105. The preferred optical fiber is disclosed in PCT/US2007/70122. As the floating roof 300 rises due to a change in fluid level in the tank, the roof 300 will reach a point where it touches the optical switch housing 101. A further rise of the roof 300 (see FIG. 1B) will cause the optical switch housing 101 orientation to change or to tilt in response to the roof's position. This tilt of the housing results in causes the moveable member within the switch components to move, and to hence change the transmitted light characteristics (e.g. block or unblock, change frequency, create alignment between the two fibers (such as by providing a bounce path between the two fibers), etc) on the light path between the two optically aligned or alignable fibers in the switch. The resultant is to change the switch status, for instance, from a condition of optical path present between the two fibers, to a status of optical path absent between the two fibers. This change in switch status is detected and can be used to operate an alarm, or set a tank status as full, or provide some other indication that the tank roof 300 has reached a given level. With the present embodiment, if multiple tank levels are desired, multiple optical switches 100 may have to be used, each suspended above the tank roof at a different height, each switch indicating a specific height has been reached.

The shape of the housing is not of any particular form, but preferably, after contact with the roof, the housing will thereafter tilt with additional roof upward movement. If the housing has a flat bottom, where the housing will rest in the roof, it is preferred, in this instance, that the optical switch components be positioned on the flexible cable near the housing, as the cable will tilt or bend as the roof moves upwardly after the float comes to rest on the roof. The bending of the cable will cause the moveable member to move, and a resultant change in optical switch status. As disclosed in application Ser. No. 12/576,894, the housing can simply be a housing attached at the end of the cable (see reference number 100, FIG. 4B of the Ser. No. 12/567,894 application—in this instance the "float body" shown in that figure is not needed). However, in a floating roof embodiment, environmental conditions (e.g. wind) may be problematic, in which event, the end of the cable should be weighted.

The housing 101 is preferably sealed against exterior light invasion, and is preferably constructed of materials that will resist exposure to the environment (e.g. stainless steel, PVC, polypropylene, etc). The outer sheath of the cable 105 should also be constructed of material that is light resistant and sealed against exterior light invasion, and is preferably constructed of materials that will resist exposure to the environment and is able to bend in response to the floating roof.

Figure 6:
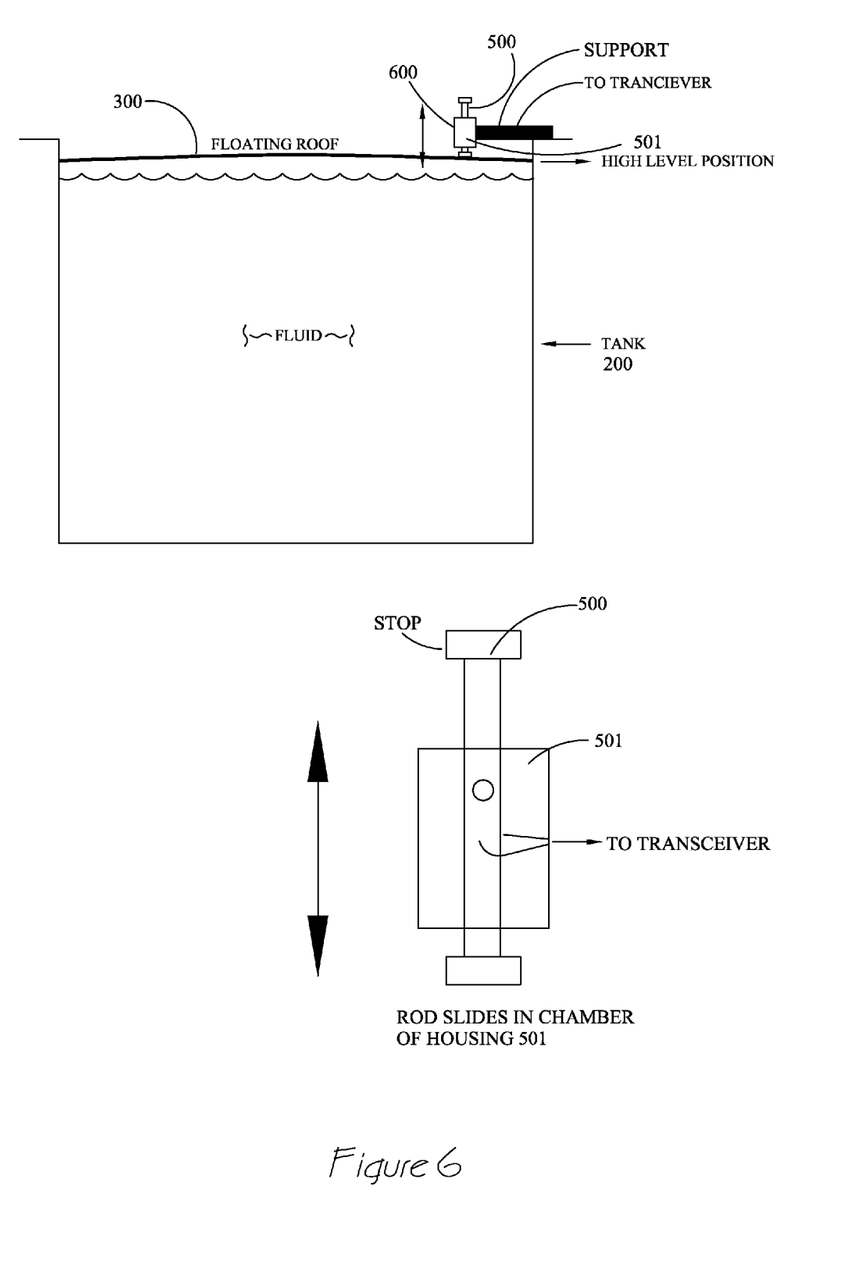
FIG. 6 is a cross section through one embodiment of a tank and optical switch, where the switch includes a rigid rod that contacts the roof at at least one height.

An alternative embodiment for use in a floating roof tank environment is shown in FIG. 6, and uses a rigid member 500, such as a rigid rod, that is slidably suspended (or rotatively suspended) above the floating roof 300. The rod 500 may touch the tank roof 300 at all times, or only touch the tank roof 300 after a specific fluid level is reached in the tank. One end of the rigid member 500 is located proximal to the floating tank roof 300, the other end is located distal. Optical switch components 600 are located in a housing 501 to interface with the movement of the rigid member 500, such as at the distal end of the rod. For instance, the optical switch fibers and gap may be located above the sidewalls of the tank and have a downward pointing hollow cylinder section and the rigid member 500 that slides in the cylinder (see FIG. 6). The optical switch fibers are aligned in the cavity of the hollow cylinder. As the rod 500 moves upward as a result of upward movement of the roof, the rod will reach a position where the rod, or a portion of the rod with different characteristics (such as an opening to allow a light beam to pass) is interposed between the two optical fibers, thereby modifying the characteristics of the received light beam communicating across the cavity—for instance, the rod could block the light beam, or have a section of the rod carrying a frequency modifying portion, such as a colored film portion to change the color of the transmitted light. Alternatively, the optical switch may simply have a path (not necessarily a cavity) through the switch or adjacent to the switch fibers where the rigid member is slidable. Alternatively, a rigid solid bar embodiment may be used with an opening therethrough at a specific location along the bar. As the bar slides through the optical switch, the bar blocks transmission from one fiber to the other, until the specific height is reached where the opening appears in the bar adjacent the fibers, resulting in a light path between the two fibers. Other arrangements can be used, for instance, the optical switch has twin parallel fibers and the bar has a reflective or glowable surface portion at a specific location (or alternatively, the rod is glowable, but having at least one portion that has a different characteristic—for instance, an opaque portion). As the rod slides through or adjacent the switch, eventually the change in rod characteristics will be detectable due to the change resulting to the emitted light through (or blocked) by the rod change. For instance, if the rod has an opening in the rod, when the rod reaches a level that the opening is aligned with the optical fibers, light will be received by the receiving fiber, thereby changing the switch status from optical path absent to optical path present. The path through the switch or adjacent the light fibers preferably is sealed from ambient light, or a frequency used for the switch that is easily detectable from ambient light. In another embodiment, the rigid member may have multiple spots along the member where characteristics of the light transmission can be altered (e.g., filters included in the rod to alter the frequency of the transmitted light, for instance, at position 1 is located a red filter, at position 2 is located a green filter, etc. In this instance, the light receiver must be able to detect not just the presence or absence of light, but also the frequency of the received light. In this fashion, a single switch allows for detection of multiple roof positions by a single optical switch. Alternatively, the rigid member may have a distinct series of openings across the rod (similar to a bar code) at different locations along the bar, where the amplitude (or other characteristic) of the transmitted light through the "bar code" is detected by the light receiver, allowing for detection of multiple fluid levels with a single switch. This increases the complexity of the detection circuitry, and is not preferred.

Alternatively, the optical switch may be positioned to interface with a slidable bar, but where the bar does not slide through a path in the switch—for instance, the bar, as it slides upwardly (or rotates) due to movement of the roof, may interface an optical switch to cause a change in switch status—for instance, the bar may have a protrusion on one side that will cause the optical switch to move or tilt as it touches the protrusion, or operate a rocker on the optical switch housing (the optical switch may be biased into position in the path of the rigid member).

Figure 2:
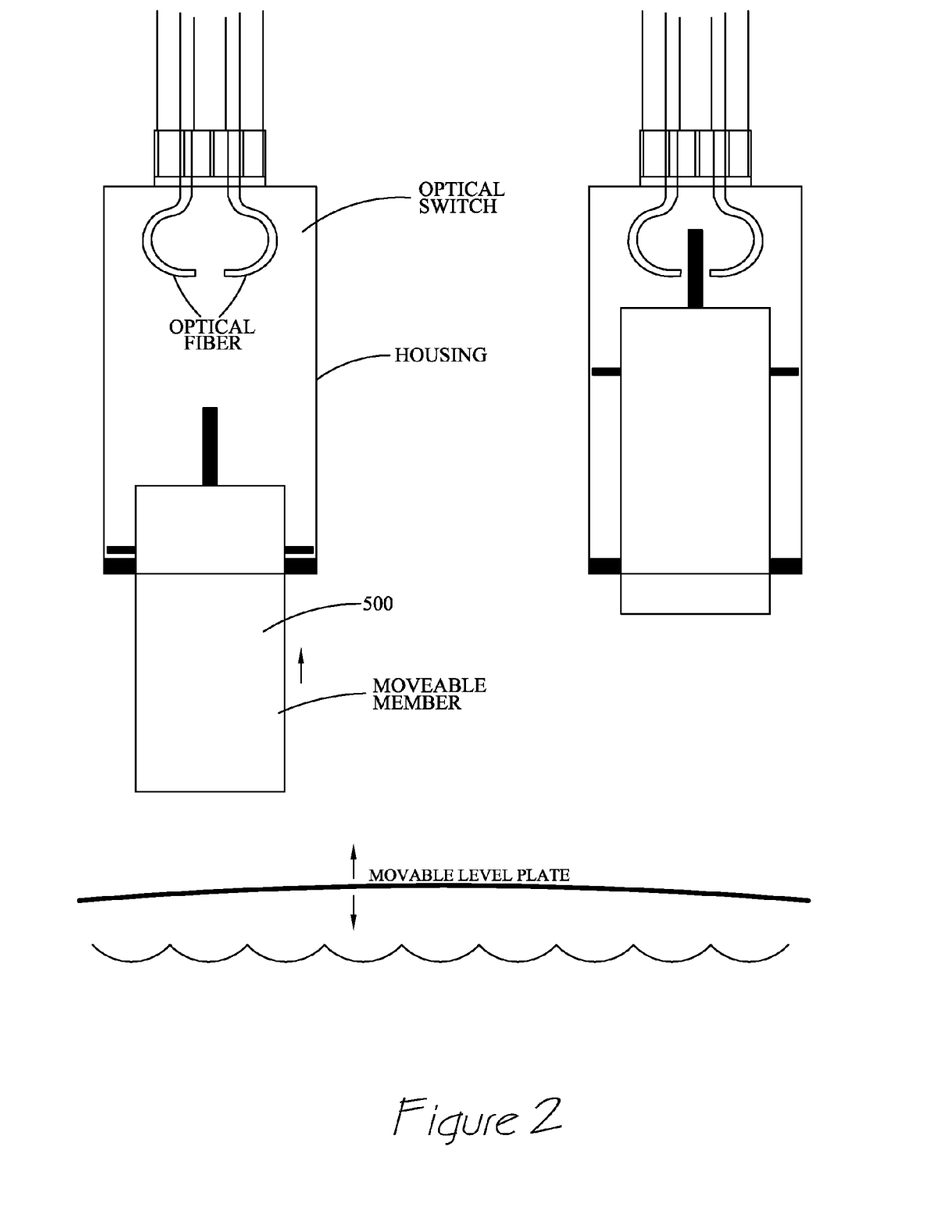
FIG. 2 is a cross section through one embodiment of an optical switch that has a moveable member that contacts the tank roof at a specified height.

Another embodiment is shown in FIG. 2 which is a plunger variation of the switch. The floating roof at a certain position will move the plunger 500 to a position where the end of the plunger enters the light transmission path to alter the transmitted light characteristics between the two optical fibers.

Figure 3:
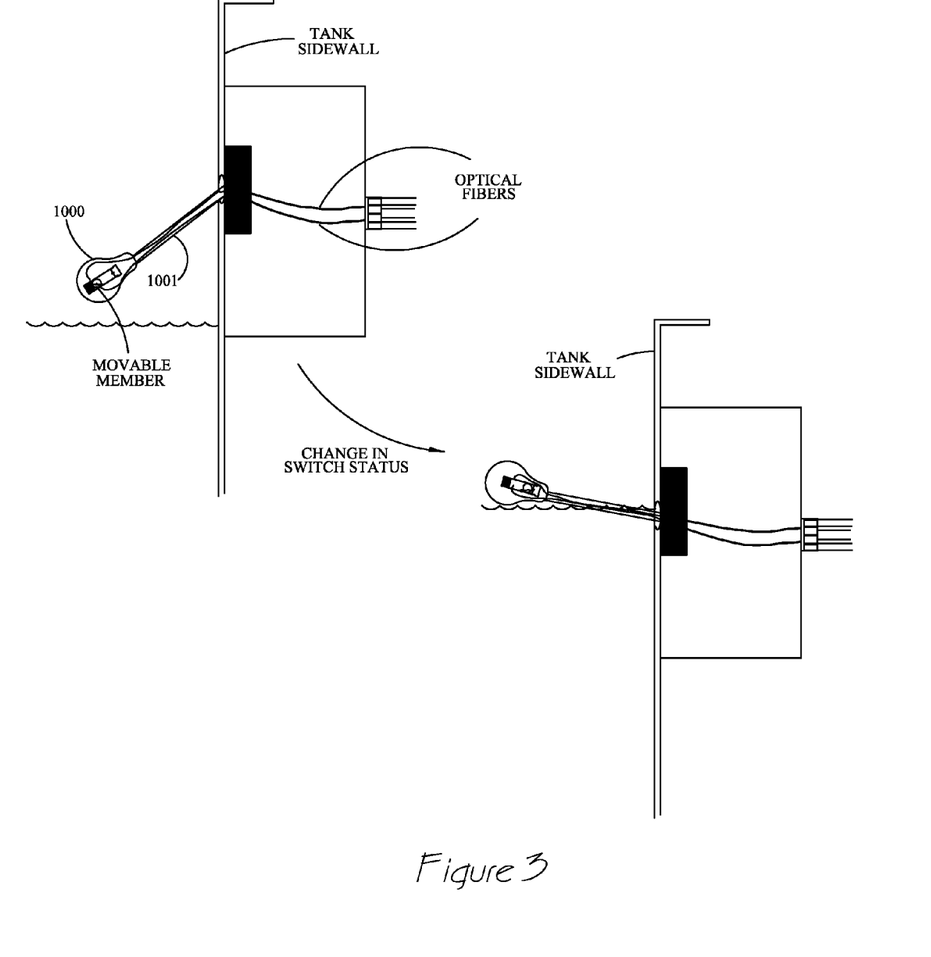
FIG. 3 is a cross section through one embodiment of a tank and optical switch, where the switch includes a rigid rod connecting a float and tank sidewall.

Another embodiment is used to directly detect fluid levels in the tank using a floating switch 1000, shown in FIG. 3. In this embodiment the floating switch is connected by a rigid rod 1001 to a hinge. The hinge may be in the interior of the tank, or the rod may sealingly extend through the tank sidewall to be hinged exterior to the tank. Alternatively, a flexible cable may be used in place of the rigid rod. In these embodiments, an opening in the tank wall is preferred, although if a flexible cable is used, the flexible cable may be tethered to the tank wall at the desired location and then routed up the tank sidewalls to exit the tank top. The optical switch components (e.g. termination point of the two fibers and the moveable members, are located in the floatable housing of the switch that is attached to the rigid rod in the embodiment shown in FIG. 3.

Instead of having the float with optical components interior to the float, as in FIG. 3, the optical components may be fixed in position, such as attached to a housing in the tank wall, with a float movable in a gap between the two fibers. The float may be restrained to move between a first position and a second position (for instance, the float may have a stop at each end, for instance, consider the embodiment shown in FIG. 6, but with the switch inside the tank and where the "rod" shown is a float. Such an embodiment could be used in a sump pump, or a tank environment (such as a fuel tank), or in a vessel, (e.g. boat or basement).

Figure 4:
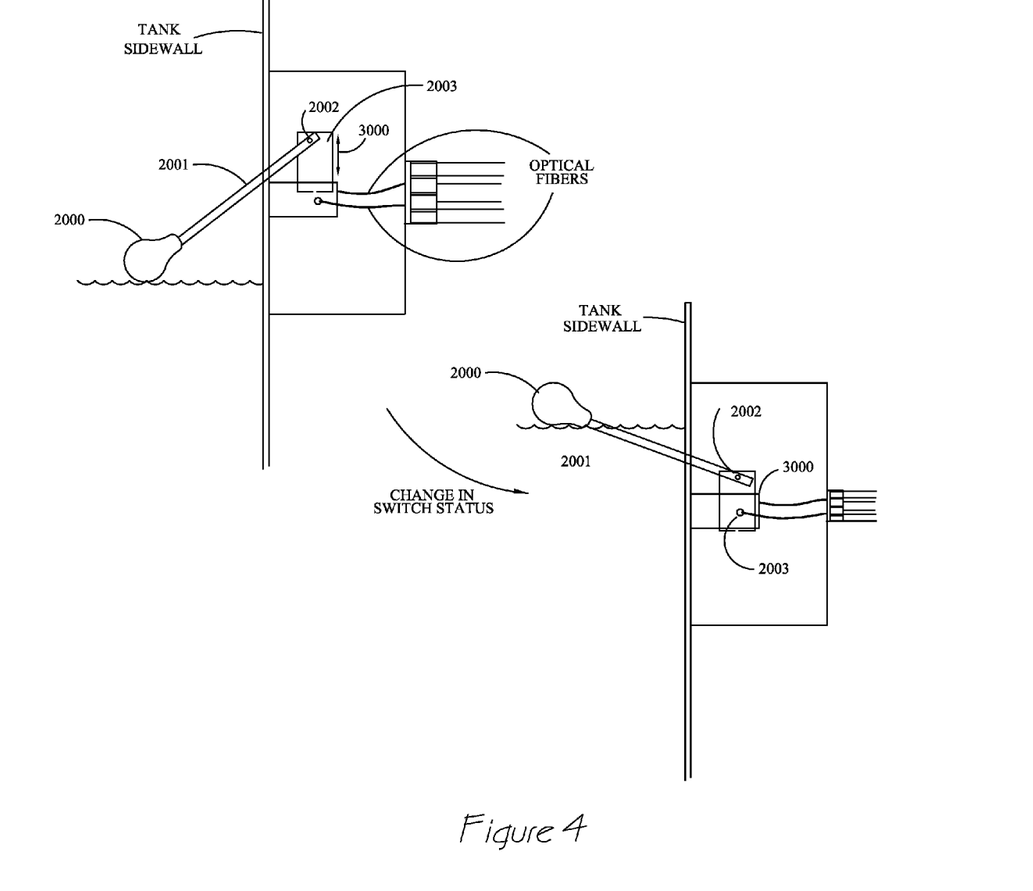
FIG. 4 is a cross section through one embodiment of a tank and optical switch, where the switch includes a rigid rod connecting a float and tank sidewall, and the rigid rod is moveable in a gap between the optical fibers.

An alternative embodiment is shown in FIG. 4 and uses a float body with no optical switch components located in the float body. The float is attached to a rigid arm 2001 at one end of the arm. The arm exits the tank through an opening (such as a slot). The other end of the arm operates as the moving member to interface the optical switch 3000. As shown, the interfacing end 2002 of the arm 2001 is attached to a member 2003 that is used to move between the ends of the optically aligned fibers to alter the transmission characteristics (such as block the light) between the fibers. In another embodiment, one of the fibers could be attached to the moveable member and would move between an optically aligned position and a non-optically aligned position with movement of the arm.

Alternatively, instead of the arm 2001 extending through the tank sidewall, the arm 2001 terminates adjacent the tank interior sidewall. The arm 2001 adjacent the tank sidewall could be magnetized or have a magnet attached, with a corresponding exterior magnet positioned opposite on the exterior of the tank sidewall, and the exterior magnet movable in the path between the two optical fibers (or where one of the fibers is connected to the magnet and moves with the magnet). The strength of the two magnets should be sufficient to magnetically couple the two magnets through the tank sidewall. As the float moves, the arm 2001 and the attached magnet would also move, and consequently, the exterior coupled magnet would also move, until it reached a position between the optical fibers and would hence modify the switch status. This embodiment may also be constructed using a single magnet, for instance, on the arm 2001 (which does not extend through the tank sidewall) and a corresponding movable ferrous metal (or other magnetically interactive material) magnetically coupled to the magnet through the tank sidewall and movable in the gap between the two fibers on the exterior sidewall of the tank (or vice versa).

Figure 7:
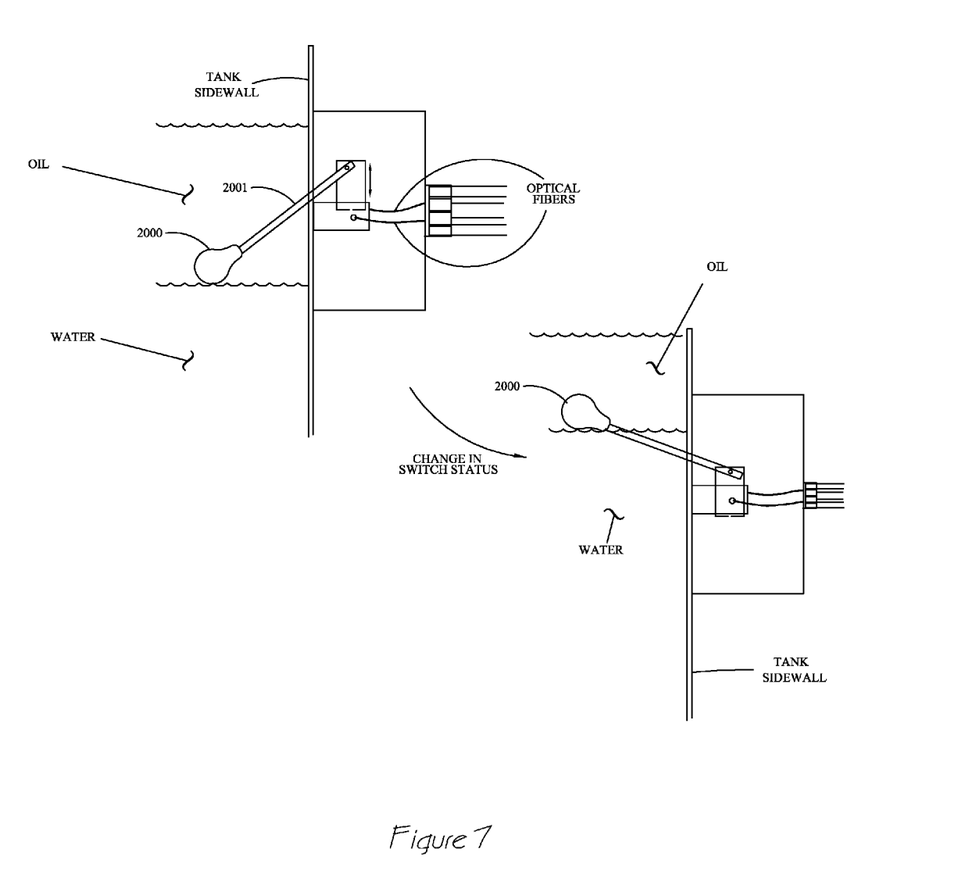
FIG. 7 is a cross section through one embodiment of a tank and optical switch, where the switch includes is used to detect an interface between two liquids of different density.

Another embodiment is shown in FIG. 7, where the tank contains two fluids, such as an oil layer and a denser water layer in an oil water separator. As shown, the float is weighted to be buoyant only in the denser of the two fluids float and used to detect the interface of the two fluids, and hence, the optical switch may be used to activate other devices, such as pumps, and valves, to separate the oil from the water. The same technique can be used in any two fluids of sufficiently different densities to develop an interface between the two fluids.

While the present invention has been described in connection with a number of embodiments and implementations, the present invention is not so limited but covers various obvious modifications and equivalent arrangements.

The invention claimed is:

1. The combination of a floating roof tank and an optical switch comprising a tank, said tank having a sidewall and a roof, said roof rising and falling in response to fluid levels in said tank, an optical switch, said optical switch having a housing, a first light fiber connected to a light source, a second light fiber connected to a light detector, said first and second fibers separated by a gap, and a moveable member, said housing and said movable member being positioned above said floating roof, said movable member moving in response to sufficient movement of said floating roof movement of the housing from first position where an optical path is present between the distal ends of the light fibers, and a second position, where an optical path is absent between the distal ends of the light fibers.

2. The combination according to claim 1 wherein said housing is suspended by a cable above said floating roof.

3. The combination of claim 1 wherein said moveable member is a rigid rod, said rigid rod slidable or rotatable in said gap in said optical switch, said rigid rod contacting said floatable roof at a predetermined vertical height of said roof.

4. The combination of a tank and an optical switch, said tank comprising a wall forming an enclosure for holding fluids, said optical switch comprising a housing floatable in a liquid stored in said tank, a first light fiber having proximal and distal ends, said first light fiber connected to a light source at said distal end of said first light fiber, a second light fiber having proximal and distal ends, said second light fiber connected to a light detector at said distal end of said second light fiber, said first and second fibers distal ends separated by a gap, a rigid rod connected to said housing and extending through said tank wall, said rigid rod moving in response to sufficient movement of said housing, from a first position, where an optical path is present between the distal ends of the light fibers, to a second position, where an optical path is absent between the distal ends of the light fibers.

5. The combination of claim 4 wherein said rigid rod is movable in said gap between said first and second light fibers distal ends.

6. The combination of claim 4 wherein said distal ends of said first and second light fibers are located exterior to said tank wall.

7. The combination of claim 4 wherein said optical switch has a moveable member, said moveable member movable in said gap in response to movement of said housing.

\* \* \* \* \*